US011109345B2

(12) United States Patent
Godin et al.

(10) Patent No.: US 11,109,345 B2
(45) Date of Patent: Aug. 31, 2021

(54) PAGING FOR DOWNLINK DATA TRANSFER IN CONNECTIONLESS MODE IN A MOBILE SYSTEM

(71) Applicant: NOKIA TECHNOLOGIES OY, Espoo (FI)

(72) Inventors: Philippe Godin, Nozay (FR); Laurent Thiebaut, Nozay (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/335,769

(22) PCT Filed: Sep. 21, 2017

(86) PCT No.: PCT/EP2017/073953
§ 371 (c)(1),
(2) Date: Mar. 22, 2019

(87) PCT Pub. No.: WO2018/055059
PCT Pub. Date: Mar. 29, 2018

(65) Prior Publication Data
US 2019/0254001 A1    Aug. 15, 2019

(30) Foreign Application Priority Data
Sep. 26, 2016   (EP) .................................. 16306233

(51) Int. Cl.
*H04W 68/02*   (2009.01)
*H04W 68/04*   (2009.01)
(Continued)

(52) U.S. Cl.
CPC .......... *H04W 68/02* (2013.01); *H04W 48/08* (2013.01); *H04W 68/00* (2013.01); *H04W 68/04* (2013.01); *H04W 80/10* (2013.01)

(58) Field of Classification Search
CPC ..... H04W 68/00; H04W 68/02; H04W 68/04; H04W 48/08; H04W 80/10
See application file for complete search history.

(56) References Cited

U.S. PATENT DOCUMENTS

2013/0015953 A1*   1/2013   Hsu .................... H04W 4/08
                                                340/7.46
2013/0301611 A1*  11/2013   Baghel ............... H04W 12/001
                                                370/331
(Continued)

FOREIGN PATENT DOCUMENTS

CN        104584671 A       4/2015
EP        1 372 349 A1     12/2003
(Continued)

OTHER PUBLICATIONS

International Search Report and Written Opinion for Application No. PCT/EP2017/073953 dated Oct. 24, 2017, 12 pages.
(Continued)

*Primary Examiner* — Candal Elpenord
(74) *Attorney, Agent, or Firm* — Alston & Bird LLP

(57) ABSTRACT

Embodiments of the invention include a User Plane Core Network entity such as UPGW, capable of interfacing with at least one RAN node via a User Plane interface such as NG3 interface, said User Plane Core Network entity configured to: —support data transfer for a UE session in a mode referred to as connectionless mode not requiring setup of a connection with a RAN node for said data transfer, —support paging request over User Plane, for DL data transfer for said UE session in connectionless mode.

24 Claims, 2 Drawing Sheets

Figure 1:
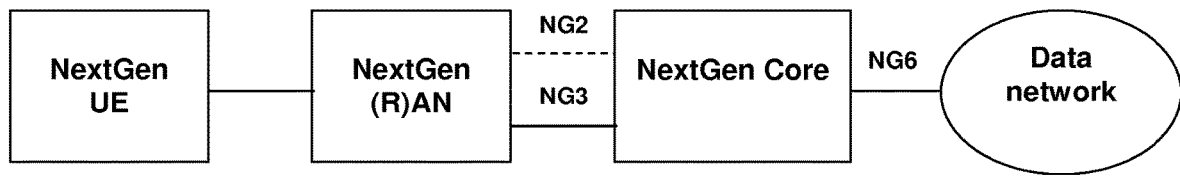

(51) Int. Cl.
  *H04W 80/10* (2009.01)
  *H04W 48/08* (2009.01)
  *H04W 68/00* (2009.01)

(56) References Cited

U.S. PATENT DOCUMENTS

| | | | |
|---|---|---|---|
| 2015/0016347 A1* | 1/2015 | Barclay | H04W 40/02 370/329 |
| 2015/0215978 A1 | 7/2015 | Casati et al. | |
| 2016/0014815 A1* | 1/2016 | Vajapeyam | H04W 4/70 370/329 |
| 2016/0057723 A1 | 2/2016 | Horn et al. | |
| 2016/0088515 A1* | 3/2016 | Griot | H04W 28/0289 370/230 |
| 2018/0199288 A1* | 7/2018 | Cho | H04W 8/02 |
| 2018/0295659 A1* | 10/2018 | Shan | H04W 76/12 |

FOREIGN PATENT DOCUMENTS

| | | |
|---|---|---|
| EP | 1 571 856 A1 | 9/2005 |
| EP | 2 683 211 A1 | 1/2014 |

OTHER PUBLICATIONS

Nokia et al., "Update to Solution 6.4.8", 3GPP Draft; S2-165119 was S2-164654 5G-CL, Update V5, $3^{rd}$ Generation Partnership Project (3GPP), vol. SA WG2 Meeting #116bis, Sanya, China; 20160829-20160902 (2016), 14 pages.

$3^{rd}$ Generation Partnership Project; Technical Specification Group Services and System Aspects; Study on Architecture for Next Generation System (Release 14), 3GPP Standard; 3GPP TR 23.799, $3^{rd}$ Generation Partnership Project (3GPP), vol. SA WG2, No. V0.8.0 (Sep. 2016), 423 pages.

Extended European Search Report for Application No. EP 16306233.4 dated Mar. 9, 2017, 10 pages.

Office Action for European Application No. 16306233.4 dated Nov. 25, 2019.

Summons to Attend Oral Proceedings for European Application No. 16306233.4 dated May 11, 2021, 4 pages.

Office Action for Chinese Application No. 2017800591107 dated Apr. 28, 2021, 14 pages.

\* cited by examiner

PAGING FOR DOWNLINK DATA TRANSFER IN CONNECTIONLESS MODE IN A MOBILE SYSTEM

CROSS-REFERENCE TO RELATED APPLICATIONS

The present application is a national phase entry of International Application No. PCT/EP2017/073953, filed Sep. 21, 2017, which claims priority to EP Application No. 16306233.4, filed Sep. 26, 2016, all of which are incorporated herein by reference in their entirety.

The present invention generally relates to mobile communication networks and systems.

Descriptions of mobile networks and systems can be found in the literature, such as in particular in Technical Specifications published by standardization bodies such as for example 3GPP ($3^{rd}$ Generation Partnership Project).

In general, in a mobile system, a terminal (also called User Equipment UE) can have access to various data networks via a mobile network. The mobile network generally comprises a Core Network (CN) accessed via an access network such as a Radio Access Network (RAN).

Different mobile systems of different generations have been standardized over time, for example EPS (Evolved Packet System) for 4G generation.

A next generation of mobile system, called 5G, is currently in the process of being standardized. In particular, 3GPP is currently studying (in particular in 3GPP TR 23.799) an architecture for a Next Generation system.

One of the requirements set for such architecture for a Next Generation system (see e.g. 3GPP TR 23.799) is to minimize the signaling (and delay) required to start the traffic exchange between the UE and the Data Network, i.e. signaling overhead and latency at transition from a period where UE has no data traffic to a period with data traffic.

A solution addressing such requirement, based on data transfer in connectionless mode, has been proposed in 3GPP document S2-165119. Different procedures for data transfer in connectionless mode have been proposed in 3GPP document S2-165119, including a procedure for paging for downlink data transfer in connectionless mode. As recognized by the inventors and as will be explained with more detail, such procedure for paging for downlink data transfer in connectionless mode would by itself generate a lot of signaling, which could make such solution based on connectionless mode not attractive. There is a need for another approach for paging for downlink data transfer in connectionless mode, in particular avoiding such drawbacks. More generally there is a need to improve performances of such systems, such as Next Generation (or 5G) system.

Embodiments of the present invention in particular address such needs.

These and other objects are achieved, in one aspect, by a User Plane Core Network entity such as UPGW, capable of interfacing with at least one RAN node via a User Plane interface such as NG3 interface, said User Plane Core Network entity configured to:
support data transfer for a UE session in a mode referred to as connectionless mode not requiring setup of a connection with a RAN node for said data transfer,
support paging request over User Plane, for DL data transfer for said UE session in connectionless mode.

These and other objects are achieved, in another aspect, by a RAN node, capable of interfacing in the User Plane with a User Plane Core Network entity such as UPGW, said RAN node configured to:
support data transfer for a UE session in a mode referred to as connectionless mode not requiring setup of a connection with the User Plane Core Network entity for said data transfer,
support paging triggered from the User Plane interface to the User Plane Core Network entity, for DL data transfer for said UE session in connectionless mode.

These and other objects are achieved, in another aspect, by a Control Plane Core Network entity capable of interfacing with a User Plane Core Network entity such as UPGW, said Control Plane Core Network entity configured to:
provide to said User Plane Core Network entity information for paging a UE served by said Control Plane Core Network entity.

These and other objects are achieved, in another aspect, by method(s) for paging for downlink data transfer in connectionless mode in a mobile system, said method(s) comprising at least one step performed by at least one of the thus configured entities: User Plane Core Network entity such as UPGW, RAN node, Control Plane Core Network entity.

Figure 2:
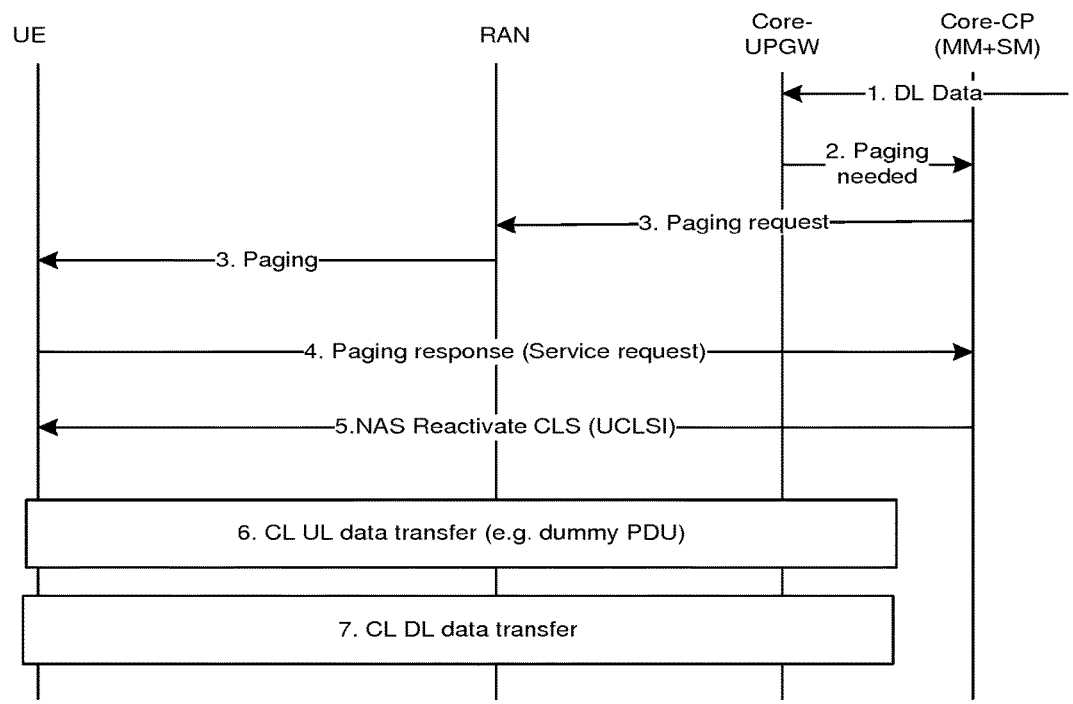
Figure 3:
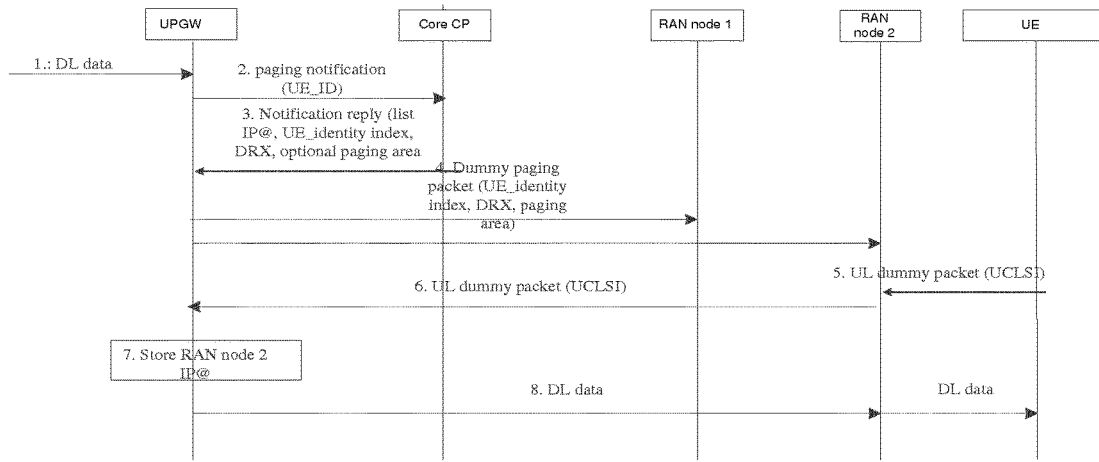
Figure 4:
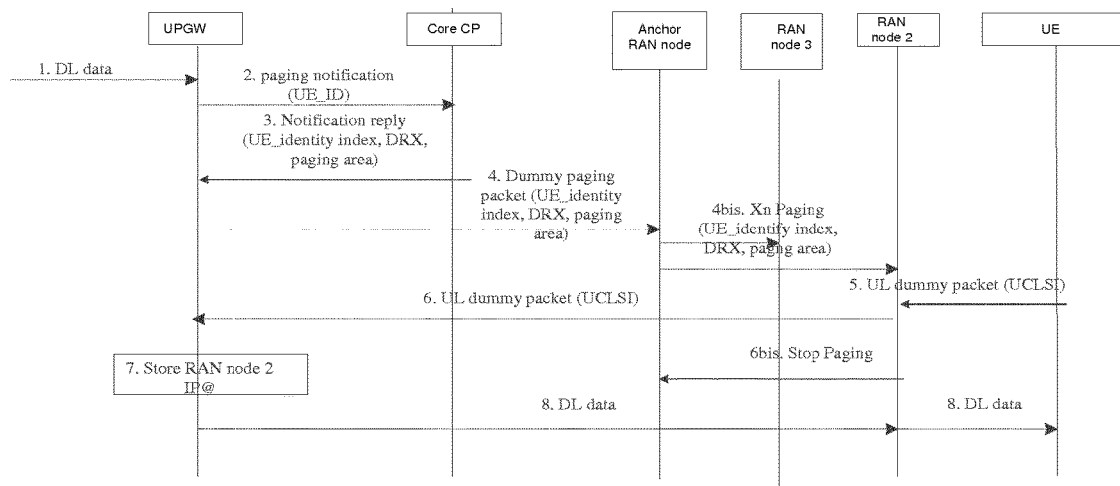

Some embodiments of apparatus and/or methods in accordance with embodiments of the present invention are now described, by way of example only, and with reference to the accompanying drawings, in which:

FIG. 1 is intended to provide a high level architecture view of a system such as Next Generation (or 5G) system, FIG. 2 is intended to illustrate a call flow for paging for downlink data transfer in connectionless mode, according to a currently proposed solution, FIG. 3 is intended to illustrate, in a simplified way, an example of call flow for paging for downlink data transfer in connectionless mode, according to first embodiments of the present invention, FIG. 4 is intended to illustrate, in a simplified way, an example of call flow for paging for downlink data transfer in connectionless mode, according to second embodiments of the present invention.

ABBREVIATIONS

CL Connectionless
CP Control Plane
DL Downlink
DRX Discontinuous Reception
NAS Non Access Stratum
PDU Packet Data Unit
RAN Radio Access Network
RRC Radio Resource Control
UCLSI UPGW CL Service Information
UE User Equipment
UL Uplink
UP User Plane
UPGW User Plane Gateway

DESCRIPTION OF VARIOUS ASPECTS AND/OR EMBODIMENTS OF THE INVENTION

FIG. 1 (taken from 3GPP TR 23.799) provides a high level architecture view of a Next Generation (or 5G) system.
Illustrated in FIG. 1 are:
Next Generation User Equipment, NextGen UE,
Next Generation (Radio) Access Network, NextGen (R)AN,
Next Generation Core Network, NextGen Core,
Data Network.

Also illustrated in FIG. 1 are:
NG2: Control Plane interface between NextGen (R)AN and NextGen Core
NG3: User Plane interface between NextGen (R)AN and NextGen Core.

Although not illustrated specifically in FIG. 1, the Next Generation Core includes different nodes or entities such as:
User Plane Gateway (UPGW) interfacing with Next Generation RAN via User Plane interface NG3,
Core Control Plane (Core CP) interfacing with Next Generation RAN via Control Plane interface NG2, As defined in 3GPP TR 23.799, a system such as Next Generation (or 5G) system provides a PDU Connectivity Service (service that provides exchange of PDUs between a UE and a data network). A PDU Session is defined an as an association between UE and data network that provides a PDU connectivity service.

As indicated above, in the current definition of 5G network, a connectionless mode is under definition by 3GPP. In particular in 3GPP SA2 the latest description of one of the proposed solutions has been agreed in S2-165119. This solution exhibits clearly the gain of a connectionless mode by showing that when a packet needs to be exchanged from time to time, this can be done without needing to setup the RRC connection and the NG2 connection.

However the current solution relies on timer settings in all nodes UE, RAN and UPGW. When UPGW timer elapses (no packet exchanged through this UPGW for this UE for some time) the UE reaches the state "UPGW UCLSI idle". In that state if a DL packet arrives at UPGW the UPGW does not know where (to which RAN node) to send the packet to.

In the solution described in S2-165119, when a DL packet arrives at the UPGW and corresponding PDU session is in UCLSI idle state (i.e. there is no more a RAN node associated with the PDU session), the UPGW contacts the Core CP (Control Plane) so that Core CP pages the UE. The paged UE then initiates a NAS message exchange with the Core CP. This solution is recalled in FIG. 2, with a call flow taken from document S2-165119.

As recognized by the inventors, such solution in particular has following drawbacks.

The NAS exchange shown in above figure (paging response followed by NAS reactivate) leads to UE setting up the RRC connection with RAN node and RAN node setting up the NG2 connection between RAN and the Core CP. This RRC and NG2 connection must also be released at the end of the NAS connection.

It therefore appears that when a DL packet arrives after the UPGW timer has expired (UPGW UCLSI idle state), a lot of signaling is exchanged which outweighs somehow all the gain realized by the connectionless aspect while the timer is still running (UPGW-UE reachable state).

Embodiments of the invention in particular allow to avoid such drawbacks.

Embodiments of the invention may particularly, although not exclusively, apply to a system such as Next Generation (or 5G) system.

In an embodiment, a user plane paging mechanism for this connectionless mode is defined. It aims at sending a DL packet to the UE when the UPGW state is "UPGW UCLSI idle" while not having the drawback of all the control plane signaling exchange as presented in the above-recalled solution.

Different embodiments for such mechanism will be described in connection with FIG. 3 (example of call flow for first embodiments) and FIG. 4 (example of call flow for second embodiments).

First embodiments (example of call flow illustrated in FIG. 3) may be described in the following way.

In an embodiment, when the UPGW has received DL traffic for a PDU session which is in UCLSI IDLE state, the UPGW may ask the Core CP to provide information on where to page the corresponding UE. This information may correspond to the list of the addresses (e.g. NG3 tunneling information) of the RAN nodes through which the UE is to be paged.

In an embodiment, the Core CP may reply including at least information on where to page the corresponding UE (at least the NG3 tunneling information address of the RAN node(s) through which to page the UE) plus parameters necessary for the paging (at least a UE_identity index enabling calculation of paging occasions for that UE, DRX parameter, optionally a paging area).

In an embodiment, the UPGW may send to all involved RAN nodes indicated by the Core CP a DL dummy packet indicating paging which packet is embedded over NG3 tunnel and with the tunnel extension including the paging parameters (UE_identity index, optionally the paging area, etc.) and a paging request indicator.

In an embodiment, each RAN node may use the received UE_identity index to calculate the paging occasion and pages the UE in relevant cells (depending paging area).

In an embodiment, when UE is reached, the UE may directly send as a reply an UL dummy packet including its UE connectionless identifier (UCLSI) which UL packet is forwarded over the user plane NG3 interface to the UPGW.

In an embodiment, upon receiving the UL packet the UPGW may move the PDU session to the reachable state, store the RAN node NG3 address where the UE replied, and send any buffered DL traffic towards the UE via this RAN node.

In some embodiments, part or all of following steps (illustrated in FIG. 3) may be provided.

Step 1: DL data arrives at UPGW

Step 2: UPGW may notify the Core CP of the necessity to page including information allowing to identify the UE (e.g. UCLSI) and buffer all DL traffic for the corresponding PDU session up to step 8

Step 3: Core CP may reply including a list of paging parameters including at least information on where to page the corresponding UE (at least the NG3 addresses of the RAN nodes (e.g. RAN node 1 and RAN node 2 in the illustrated example) through which to page the UE) plus parameters necessary for the paging (at least a UE_identity index enabling calculation of paging occasions for that UE, DRX parameter, optionally a paging area).

Step 4: UPGW may send a dummy DL paging packet indication paging request over the user plane NG3 interface to the relevant RAN nodes using the received list of NG3 addresses as input. Contacted RAN nodes page in their respective cells, possibly taking into account the paging area if received.

Step 5: UE may be reached e.g. under RAN node 2 in the illustrated example, and may send a dummy UL packet containing its connectionless identifier UCLSI.

Step 6: RAN node 2 may memorize UCLSI and start the connectionless timer. At same time it may forward the UL packet to the UPGW identified through the received UCLSI.

Step 7: upon receiving the UL packet over NG3 interface, the UPGW may store the RAN node 2 IP address as the RAN node where the UE is located and may move the connectionless UCLSI state to "Reachable".

Step 8: UPGW may now forward the original DL packet(s) received since step 1 to the UE via the RAN node 2 and the corresponding user plane NG3 interface.

Second embodiments (example of call flow illustrated in FIG. 4) may be described in the following way.

In an embodiment, the UPGW may ask the Core CP which provides back to UPGW paging parameter (at least a UE_identity index enabling calculation of paging occasions for that UE, DRX, paging area). In another embodiment, the Core CP may have provided paging parameter to the UPGW at the creation of the context in the UPGW related with the PDU session. In an embodiment, the UPGW may send to the last RAN node where it has exchanged data with the UE (at least NG3 address of that RAN node may need to be stored in UPGW context even in "UPGW UCLSI idle state" together with the UCLSI) called here "anchor RAN node" for convenience, a DL dummy packet indicating paging request which packet is embedded over NG3 tunnel and with the tunnel extension including the paging parameters (UE_identity index, DRX, paging area, etc.) and the paging request indicator.

In an embodiment, the anchor RAN node may use the received UE_identity index to calculate the paging occasion and page the UE in its relevant cells.

In an embodiment, the "anchor RAN node" may also use the received paging area to infer those neighbor RAN nodes to page over an Xn interface (RAN node-RAN node interface). The anchor RAN node may send Xn paging message to those neighbor RAN nodes including at least the UE_identity index and possibly the paging area. Each RAN node receiving this Xn paging may page the UE in its relevant cells.

In an embodiment, when UE is reached, e.g. by RAN node 2 in the illustrated example, the UE may directly send as a reply an UL dummy packet to RAN node 2 including its UE connectionless identifier (UCLSI), which UL packet may then be forwarded by RAN node 2 to UPGW.

In an embodiment, upon receiving the UL packet the UPGW can move the UE to reachable state and store the IP address of RAN node 2 as the RAN node where UE is located. RAN node 2 may also send an Xn "paging response" or "stop paging" message to the "anchor RAN node" so that the anchor RAN node can stop the paging repetitions.

In some embodiments, part or all of following steps (illustrated in FIG. 4) may be provided.

Step 1: DL data arrives at UPGW.

Step 2: UPGW may notify the Core CP of the necessity to page including information allowing to identify the UE (e.g. UCLSI) and may buffer all DL traffic for the corresponding PDU session up to step 8.

Step 3: Core CP may reply including a list of paging parameters.

NOTE: step 2 and step 3 are not needed in the other embodiment where the paging parameter for that UE have already been provided earlier at the creation of the context in UPGW corresponding to that PDU session.

Step 4 and 4bis: UPGW may send a dummy DL paging packet over the user plane NG3 interface to the anchor RAN node. Contacted anchor RAN node can page in its cells, possibly taking into account the paging area if received. Anchor RAN node may also page over Xn interface the neighbor RAN (e.g. RAN node 2 and RAN node 3 in the illustrated example) based on received paging area, including the paging parameters.

Step 5: UE may be reached e.g. under RAN node 2 in the illustrated example, and may send a dummy UL packet containing its connectionless identifier UCLSI.

Step 6 and 6bis: RAN node 2 may memorize UCLSI and start the connectionless timer. At same time it may forward the UL packet to the UPGW identified through the received UCLSI. It may also send a "stop paging" message to the anchor RAN node so that anchor RAN node can stop paging.

Step 7: upon receiving the UL packet over NG3 interface, the UPGW may store the RAN node 2 IP address as the RAN node where the UE is now located and it may move the connectionless UE state to "Reachable".

Step 8: UPGW may now forward the original DL packet received since step 1 to the UE via the RAN node 2 and the corresponding user plane NG3 interface.

Embodiments of the invention thus allow to reach the UE in connectionless mode using only dummy packets with paging request indicator exchanged over the user plane NG3 interface even when the UPGW has moved the UE in "UPGW connectionless UCLSI IDLE" state.

In embodiments of the invention, the paging is managed by the UPGW over the user plane instead of involving the MME paging over NAS and the associated control plane signaling (which normally requires to setup an RRC connection and an NG2 control pane connection). As a result lots of RRC and NG2 signaling is saved for the MT scenario compared to the current solution (recalled above), which makes the overall connectionless solution become attractive.

Various aspects and/or embodiments of the invention include (though not being limited to) following aspects and/or embodiments.

Some aspects are related to a User Plane Core Network entity such as UPGW, capable of interfacing with at least one RAN node via a User Plane interface such as NG3 interface.

Various embodiments are provided, including (though not being limited to) following embodiments, which may be taken alone or in combination, according to various combinations.

In an embodiment, said User Plane Core Network entity is configured to:

support data transfer for a UE session in a mode referred to as connectionless mode not requiring setup of a connection with a RAN node for said data transfer, support paging request over User Plane, for DL data transfer for said UE session in connectionless mode.

In an embodiment, said User Plane Core Network entity is configured to:

upon reception of DL data for said UE session in connectionless mode, in a state referred to as connectionless Idle state where paging is required, send over said user plane interface to at least one RAN node through which to page the UE, a DL dummy packet indicating a paging request.

In an embodiment, said User Plane Core Network entity is configured to:

upon reception of DL data for said UE session in connectionless mode, in a state referred to as connectionless Idle state where paging is required, send over said interface to at least one RAN node through which to page the UE, a DL dummy packet indicating a paging request, with at least one paging parameter for paging the UE.

In an embodiment, said User Plane Core Network entity is configured to:
send said DL dummy packet indicating a paging request, in a tunnel over said interface, with said paging request and said at least one paging parameter included in a tunnel extension.

In an embodiment, said User Plane Core Network entity is configured to:
ask a Control Plane Core Network entity serving said UE in the Control Plane, to provide information related to at least one paging parameter for paging the UE.

In an embodiment, said User Plane Core Network entity is configured to:
receive from a Control Plane Core Network entity serving said UE in the Control Plane, at the creation of a context in the User Plane Core Network entity related with the UE session, information related to at least one paging parameter for paging the UE.

In an embodiment, said User Plane Core Network entity is configured to:
ask a Control Plane Core Network entity serving said UE in the Control Plane, to provide addressing information of at least one RAN node through which to page the UE.

In an embodiment, said User Plane Core Network entity is configured to:
upon reception of DL data for said UE session in connectionless mode, in a connectionless Idle state where paging is required, send over said User Plane interface, to at least one of the RAN nodes indicated in said addressing information, a DL dummy packet indicating a paging request.

In an embodiment, said User Plane Core Network entity is configured to:
store, even in a state referred to as connectionless idle state where paging is required, addressing information of a RAN node with which the User Plane Core Network entity has last exchanged data over said User Plane interface.

In an embodiment, said User Plane Core Network entity is configured to:
upon reception of DL data for said UE session in connectionless mode, in a connectionless Idle state where paging is required, send over said User Plane interface, to a RAN node with which the User Plane Core Network entity has last exchanged data for the UE session from said above stored information, a DL dummy packet indicating a paging request.

In an embodiment, said User Plane Core Network entity is configured to:
upon reception from a RAN node, over said User Plane interface, of a UL dummy packet as a reply to said paging, said UL dummy packet containing a connectionless identifier identifying said UE session in connectionless mode, perform at least one of: move a connectionless state from an Idle state where paging is required to a Reachable state where paging is not required, store addressing information of said RAN node, send buffered DL data for said UE session to said RAN node over said interface.

Other aspects are related to a RAN node, capable of interfacing in the User Plane with a User Plane Core Network entity such as UPGW.

Various embodiments are provided, including (though not being limited to) following embodiments, which may be taken alone or in combination, according to various combinations.

In an embodiment, said RAN node is configured to:
support data transfer for a UE session in a mode referred to as connectionless mode not requiring setup of a connection with the User Plane Core Network entity for said data transfer,
support paging triggered from the User Plane interface to the User Plane Core Network entity, for DL data transfer for said UE session in connectionless mode.

In an embodiment, said RAN node is configured to:
upon reception from the User Plane Core Network entity, over said User Plane interface, of a DL dummy packet indicating a paging request, page the UE.

In an embodiment, said RAN node is configured to:
upon reception from the User Plane Core Network entity, over said User Plane interface, of a DL dummy packet indicating a paging request with at least one paging parameter for paging the UE, page the UE based on said at least one paging parameter.

In an embodiment, said RAN node is configured to:
upon reception from the User Plane Core Network entity, over said User Plane interface, of a DL dummy packet indicating a paging request, send a paging message to at least one neighbour RAN node over a RAN node-RAN node interface such as Xn interface.

In an embodiment, said RAN node is configured to:
upon reception from the User Plane Core Network entity, over said User Plane interface, of a DL dummy packet indicating a paging request with at least one paging parameter for paging the UE including a paging area, infer, based on said paging area, at least one neighbour RAN node to page over a RAN node-RAN node interface such as Xn interface.

In an embodiment, said RAN node is configured to:
upon reception from the User Plane Core Network entity, over said User Plane interface, of a DL dummy packet indicating a paging request, with at least one paging parameter for paging the UE, send a paging message with at least one of the said at least one paging parameter to at least one neighbour RAN node to page over a RAN node-RAN node interface such as Xn interface.

In an embodiment, said RAN node is configured to:
upon reception from the User Plane Core Network entity of a DL dummy packet indicating a paging request, or upon reception of a paging message received over RAN node-RAN node interface such as Xn interface from a neighbour RAN node, with at least one paging parameter for paging the UE including a paging area, page the UE in relevant cells depending on said paging area.

In an embodiment, said RAN node is configured to:
upon reception from the UE, as a reply to a paging message, of a UL dummy packet containing a connectionless identifier identifying said UE session in connectionless mode, forward said UL dummy packet, based on said connectionless identifier, to said User Plane Core Network entity.

In an embodiment, said RAN node is configured to:
upon reception from the UE, as a reply to a paging message, of a UL dummy packet containing a connectionless identifier identifying said UE session in connectionless mode, memorize said connectionless identifier, and forward said UL dummy packet, based on said connectionless identifier, to said User Plane Core Network entity.

In an embodiment, said RAN node is configured to:
upon reception from the UE of a reply to said paging, send to a RAN node from which it received a paging message over a RAN node-RAN node interface such as Xn interface, a stop paging message.

Other aspects are related to a Control Plane Core Network entity capable of interfacing with a User Plane Core Network entity such as UPGW.

Various embodiments are provided, including (though not being limited to) following embodiments, which may be taken alone or in combination, according to various combinations.

In an embodiment, said Control Plane Core Network entity is configured to:
provide to said User Plane Core Network entity information for paging a UE served by said Control Plane Core Network entity.

In an embodiment, said Control Plane Core Network entity is configured to:
upon request, provide to said User Plane Core Network entity addressing information of at least one RAN node through which to page the UE.

In an embodiment, said Control Plane Core Network entity is configured to:
at the creation of a context in the User Plane Core Network entity related with the UE session, provide to said User Plane Core Network entity information related to at least one paging parameter for paging the UE.

In an embodiment, said Control Plane Core Network entity is configured to:
upon request, provide to said User Plane Core Network entity information related to at least one paging parameter for paging the UE.

Other aspects relate to method(s) for paging for downlink data transfer in connectionless mode in a mobile system, said method(s) comprising at least one step performed by at least one of the thus configured entities: User Plane Core Network entity such as UPGW, RAN node, Control Plane Core Network entity.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus comprising
at least one processor; and
at least one memory including computer program code,
the at least one memory and the computer program code configured to, with the at least one processor, cause the apparatus at least to perform:
provide functions of a user plane core network entity interfacing with at least one radio access network node via a user plane interface,
support data transfer for a user equipment session in a mode referred to as a connectionless mode not requiring setup of a connection with a radio access network node for said data transfer,
support paging over a user plane, for downlink data transfer for said user equipment session in the connectionless mode, and
upon reception of downlink data for said user equipment session in the connectionless mode, in a state referred to as a connectionless idle state where paging is required, send over said user plane interface to at least one radio access network node through which to page the user equipment, a downlink dummy packet indicating a paging request.

2. The apparatus according to claim 1, wherein the downlink dummy packet includes at least one paging parameter for paging the user equipment.

3. The apparatus according to claim 1, wherein the at least one memory and the computer program code are configured to, with the at least one processor, cause the apparatus to perform:
send the downlink dummy packet indicating the paging request, in a tunnel over said interface, with said paging request and at least one paging parameter included in a tunnel extension.

4. The apparatus according to claim 1, wherein the at least one memory and the computer program code are configured to, with the at least one processor, cause the apparatus to perform:
ask a control plane core network entity serving said user equipment in the control plane, to provide information related to at least one paging parameter for paging the user equipment.

5. The apparatus according to claim 1, wherein the at least one memory and the computer program code are configured to, with the at least one processor, cause the apparatus to perform:
receive from a control plane core network entity serving said user equipment in the control plane, at the creation of a context in the user plane core network entity related with the user equipment session, information related to at least one paging parameter for paging the user equipment.

6. The apparatus according to claim 1, wherein the at least one memory and the computer program code are configured to, with the at least one processor, cause the apparatus to perform:
ask a control plane core network entity serving said user equipment in the control plane, to provide addressing information of at least one radio access network node through which to page the user equipment.

7. The apparatus according to claim 1, wherein the at least one radio access network node to which the downlink dummy packet is sent comprises at least one of the radio access network nodes indicated in addressing information of at least one radio access network node through which to page the user equipment.

8. The apparatus according to claim 1, wherein the at least one memory and the computer program code are configured to, with the at least one processor, cause the apparatus to perform:
store, even in a state referred to as the connectionless idle state where paging is required, addressing information of a radio access network node with which the user plane core network entity has last exchanged data over said user plane interface.

9. The apparatus according to claim 1, wherein the at least one radio access network node to which the downlink dummy packet is sent is the radio access node with which the user plane core network entity has last exchanged data for the user equipment session.

10. The apparatus according to claim 1, wherein the at least one memory and the computer program code are configured to, with the at least one processor, cause the apparatus to perform:
upon reception from a radio access network node, over said user plane interface, of a uplink dummy packet as a reply to said paging, said uplink dummy packet containing a connectionless identifier identifying said user equipment session in the connectionless mode, perform at least one of: move a connectionless state from an idle state where paging is required to a reachable state where paging is not required, store addressing information of said radio access network node, or send buffered downlink data for said user equipment session to said radio access network node over said interface.

11. An apparatus comprising
at least one processor; and
at least one memory including computer program code,
the at least one memory and the computer program code configured to, with the at least one processor, cause the apparatus at least to perform:
provide functions of a radio access network node interfacing in a user plane with a user plane core network entity,
support data transfer for a user equipment session in a mode referred to as a connectionless mode not requiring setup of a connection with the user plane core network entity for said data transfer,
support paging over the user plane, for downlink data transfer for said user equipment session in the connectionless mode, in a state referred to as a connectionless idle state where paging is required, and
upon reception from the user plane core network entity, over said user plane interface, of a downlink dummy packet indicating a paging request, page the user equipment.

12. The apparatus according to claim 11, wherein the at least one memory and the computer program code are configured to, with the at least one processor, cause the apparatus to perform:
upon reception from the user plane core network entity, over said user plane interface, of the downlink dummy packet indicating the paging request with at least one paging parameter for paging the user equipment, page the user equipment based on said at least one paging parameter.

13. The apparatus according to claim 11, wherein the at least one memory and the computer program code are configured to, with the at least one processor, cause the apparatus to perform:
upon reception from the user plane core network entity, over said user plane interface, of the downlink dummy packet indicating the paging request, send a paging message to at least one neighbour radio access network node over a radio access network node-radio access network node interface.

14. The apparatus according to claim 11, wherein the at least one memory and the computer program code are configured to, with the at least one processor, cause the apparatus to perform:
upon reception from the user plane core network entity, over said user plane interface, of the downlink dummy packet indicating the paging request with at least one paging parameter for paging the user equipment including a paging area, infer, based on said paging area, at least one neighbour radio access network node to page over a radio access network node-radio access network node interface.

15. The apparatus according to claim 11, wherein the at least one memory and the computer program code are configured to, with the at least one processor, cause the apparatus to perform:
upon reception from the user plane core network entity, over said user plane interface, of the downlink dummy packet indicating the paging request, with at least one paging parameter for paging the user equipment, send a paging message with at least one of the said at least one paging parameter to at least one neighbour radio access network node to page over a radio access network node-radio access network node interface.

16. The apparatus according to claim 11, wherein the at least one memory and the computer program code are configured to, with the at least one processor, cause the apparatus to perform:
upon reception from the user plane core network entity of the downlink dummy packet indicating the paging request, or upon reception of a paging message received over a radio access network node-radio access network node interface from a neighbour radio access network node, with at least one paging parameter for paging the user equipment including a paging area, page the user equipment in relevant cells depending on said paging area.

17. The apparatus according to claim 11, wherein the at least one memory and the computer program code are configured to, with the at least one processor, cause the apparatus to perform:
upon reception from the user equipment, as a reply to a paging message, of a uplink dummy packet containing a connectionless identifier identifying said user equipment session in the connectionless mode, forward said uplink dummy packet, based on said connectionless identifier, to said user plane core network entity.

18. The apparatus according to claim 11, wherein the at least one memory and the computer program code are configured to, with the at least one processor, cause the apparatus to perform:
upon reception from the user equipment, as a reply to a paging message, of a uplink dummy packet containing a connectionless identifier identifying said user equipment session in the connectionless mode, memorize said connectionless identifier, and forward said uplink dummy packet, based on said connectionless identifier, to said user plane core network entity.

19. The apparatus according to claim 11, wherein the at least one memory and the computer program code are configured to, with the at least one processor, cause the apparatus to perform:
upon reception from the user equipment of a reply to said paging, send to a radio access network node from which it received a paging message over a radio access network node-radio access network node interface, a stop paging message.

20. An apparatus comprising
at least one processor; and
at least one memory including computer program code,
the at least one memory and the computer program code configured to, with the at least one processor, cause the apparatus at least to perform:
provide functions of a control plane core network entity interfacing with a user plane core network entity, said control plane core network entity serving a user equipment, said user plane core network entity interfacing with at least one radio access network node via a user plane interface, said user plane core network entity supporting data transfer for a session for the user equipment in a mode referred to as a connectionless mode not requiring setup of a connection with a radio access network node for said data transfer, said user plane core network entity supporting paging over a user plane, for downlink data transfer for said user equipment session in the connectionless mode, in a state referred to as a connectionless idle state where paging is required, and provide to said user plane core network entity information for said paging of said user equipment over the user plane, wherein said paging over the user plane comprises sending a downlink dummy packet indicating a paging request.

21. The apparatus according to claim 20, wherein the at least one memory and the computer program code are configured to, with the at least one processor, cause the apparatus to perform:

upon request, provide to said user plane core network entity addressing information of at least one radio access network node through which to page the user equipment.

22. The apparatus according to claim 20, wherein the at least one memory and the computer program code are configured to, with the at least one processor, cause the apparatus to perform:

at the creation of a context in the user plane core network entity related with the user equipment session, provide to said user plane core network entity information related to at least one paging parameter for paging the user equipment.

23. The apparatus according to claim 20, wherein the at least one memory and the computer program code are configured to, with the at least one processor, cause the apparatus to perform:

upon request, provide to said user plane core network entity information related to at least one paging parameter for paging the user equipment.

24. A method comprising:

supporting data transfer for a user equipment session in a mode referred to as a connectionless mode not requiring setup of a connection between a user plane core network entity and a radio access network node for said data transfer, supporting paging over a user plane, for downlink data transfer for said user equipment session in the connectionless mode and in a state referred to as a connectionless idle state where paging is required; and upon reception from the user plane core network entity, over said user plane interface, of a downlink dummy packet indicating a paging request, paging the user equipment.

* * * * *